(12) United States Patent
Krämer

(10) Patent No.: US 6,464,920 B1
(45) Date of Patent: Oct. 15, 2002

(54) INJECTION MOULDING PROCESS AND APPARATUS FOR MAKING ARTICLES FROM TWO COMPONENTS

(75) Inventor: Hans Krämer, Buehl-Altschweier (DE)

(73) Assignee: SmithKline Beecham Consumer Healthcare GmbH, Buehl, (Baden) (DE)

( * ) Notice: Subject to any disclaimer, the term of this patent is extended or adjusted under 35 U.S.C. 154(b) by 0 days.

(21) Appl. No.: 09/367,451

(22) PCT Filed: Feb. 11, 1998

(86) PCT No.: PCT/EP98/00813

§ 371 (c)(1),
(2), (4) Date: Aug. 12, 1999

(87) PCT Pub. No.: WO98/35809

PCT Pub. Date: Aug. 20, 1998

(30) Foreign Application Priority Data

Feb. 14, 1997 (EP) .............................. 97300973

(51) Int. Cl.[7] .............................. A46B 5/02; A46B 9/04; B29C 45/14; B29C 45/00
(52) U.S. Cl. ...................... 264/243; 264/255; 264/273; 264/279; 300/21; 15/143.1; 15/167.1
(58) Field of Search .............................. 15/143.1, 167.1; 300/21; 264/243, 255, 273, 279

(56) References Cited

U.S. PATENT DOCUMENTS 5,054,154 A 10/1991 Schiffer
5,305,490 A 4/1994 Lundgren

FOREIGN PATENT DOCUMENTS

| DE | 295 08 9930 | 8/1995 |
|---|---|---|
| EP | 0 293 665 A3 | 5/1988 |
| EP | 0 293 665 A2 | 5/1988 |
| EP | 0 293 665 B1 | 5/1988 |
| EP | 0 336 641 B1 | 3/1989 |
| EP | 0 336 641 A2 | 3/1989 |
| EP | 0 336 641 A3 | 3/1989 |
| EP | 0 613 636 A1 | 3/1992 |
| EP | 0 613 636 B1 | 3/1992 |
| GB | 1 503 039 | 3/1978 |
| WO | WO 92/17092 | 10/1992 |
| WO | WO 92/17093 | 10/1992 |
| WO | WO 94/05183 | 3/1994 |
| WO | WO 95/30350 | 11/1995 |
| WO | WO 97/02770 | 1/1997 |

OTHER PUBLICATIONS

Patent abstract of Japan, vol. 96, No. 4, Apr. 30, 1996 & JP 07 327737 A (Sunstar Inc.), Dec. 19, 1995, see abstract.

Reker H et al., "Konstruktion Und Fertigung Eines in "Hart–Weich–Technik"", Kunststoffe, vol. 79, No. 2, Feb. 1989, Muchen, pp. 164–166, XP000028763 see figure 4.

*Primary Examiner*—Randall E. Chin
(74) *Attorney, Agent, or Firm*—Nora Stein-Fernandez; Charles M. Kinzig

(57) ABSTRACT

A process for making a molded article of two components e.g., plastic material and elastomer, in which internal cores are used to form a hollow toothbrush body, and elastomer is injected to form surface features. The toothbrush body can be made bulky in shape but light by virtue of being hollow.

6 Claims, 2 Drawing Sheets

INJECTION MOULDING PROCESS AND APPARATUS FOR MAKING ARTICLES FROM TWO COMPONENTS

Figure 1:
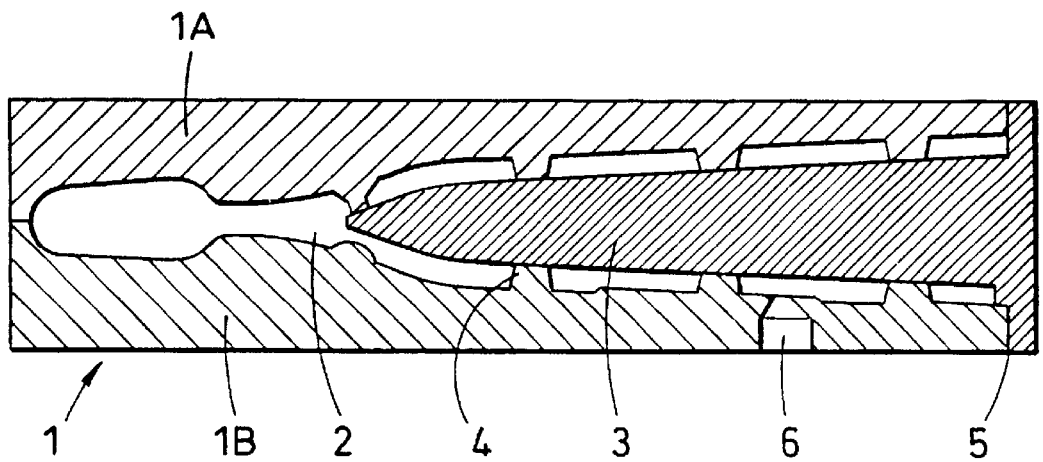

This invention relates to an injection moulding process for making articles out of two injectable components, particularly being respectively a plastics material and an elastomeric polymer material. In particular the invention relates to an injection moulding process for making toothbrush bodies, in which a first component is a plastics material and a second component is an elastomeric polymer.

The invention also relates to a toothbrush made using the process of the invention and to moulds and machines for carrying out the process.

Toothbrush bodies, i.e. comprising a grip handle and a head with generally a neck part between all arranged along a longitudinal toothbrush axis, which are made of two components being a hard plastic and a softer elastomer, are known e.g. from EP 0336641A, WO 92/17092 WO 92/17093, and U.S. Pat. No. 5,054,154 among others. Often in such toothbrushes the elastomer is present in two or more places on the toothbrush body, e.g. on the grip handle to enhance grip, and in the neck region to modify flexibility. The elastomer may also be present in other places for decoration.

Usually such toothbrushes are made by firstly moulding the plastic parts of the toothbrush then injecting in the fluid elastomer under conditions which cause the plastic and elastomer to bond. Often when the elastomer is present in two or more places on the toothbrush body these places are linked by a moulding channel so that injection of fluid elastomer at only one injection point into the pre-formed plastic parts of the body, and the fluid elastomer is able to flow along the moulding channels from one part to another. When the elastomer is present in numerous parts separated from one another the presence of a corresponding number of moulding channels to link them is an untidy solution and can lead to weakness of the structure. A self-evident alternative solution to the problem is disclosed in WO 94/05183 in which a number of separate injection points corresponding to the number of places where the elastomer is to be present is used. If the elastomer is present in numerous separated places this can lead to a complex arrangement of injection channels, with consequent difficulty and complexity in making the moulds and ancillary injection moulding machinery.

A further problem is encountered in that if the toothbrush is to have a bulky handle, e.g. in the shape of a character such as an animal, as used for children's toothbrushes, the bulk also assisting a child's small hand to grip the handle, a large amount of moulding plastic may be necessary. This adds to weight, cost and use of excessive quantities of materials.

It is an object of this invention to provide an alternative injection moulding process which in part at least overcomes these problems. Other objects and advantages of the invention will be apparent from the following account.

According to this invention a process for making a moulded article comprises the steps of:

in a first mould cavity, having a first internal core within the cavity and distanced from the inner wall surface of the cavity, and having one or more members which extend between the said inner wall and the core, forming by injection moulding of a plastics material a body part having an internal body cavity corresponding substantially to the shape of the first core and having apertures passing through the body from the said body cavity to the outer surface of the body corresponding substantially to the shape and position of the member(s);

separating the formed body from the first mould cavity and removing the first core from the body cavity;

enclosing the formed body in a second mould cavity, and inserting a second internal core into the body cavity, between the second core and the inner surface of the body cavity there being one or more channels in communication with the said apertures when the second core is in place in the body cavity;

injecting a fluid mouldable settable material into the said channels such that the material flows along the channels and into the apertures and then sets;

separating the so-formed article from the second mould cavity and the second core from the body cavity.

Preferred embodiments of the process of the invention will now be described.

The moulded article made by the process is preferably a toothbrush body, i.e. comprising a grip handle and a head with generally a neck part between all arranged along a longitudinal toothbrush axis, with the body cavity within the grip handle. The process of the invention enables the handle to be made bulky but hollow and therefore light in weight. The grip handle may for example be in an attractive shape such as the shape of a character such as a representation of an animal character or cartoon character, so that the toothbrush handle is attractive to children, and preferably to adults as well.

When the moulded article is a toothbrush body as defined above the grip handle is generally a structure elongated along the direction of the toothbrush axis. In this case the body cavity is suitably also an elongate cavity generally following the elongate shape of the body, and the internal cores will consequently be structures elongated along the direction of the toothbrush axis.

The first and second mould cavities are defined in first and second injection moulds which can be provided by known technologies. Injection moulds for toothbrushes, whether pilot or production moulds, the process of the invention being suitable for both, comprise parts, usually two mating halves, made of machined hardened metal, usually steel, which must fit together with great precision and which when fitted together enclose an accurately dimensioned internal cavity which defines the shape of the final toothbrush product, and into which is injected the material of the toothbrush. The crucial part of such moulds are their internal cavity, the features of which are dictated by the function of defining the shape of the final toothbrush product. The mould cavities within such moulds are normally formed by a process of spark erosion otherwise known as electrical discharge machining, which is for example practiced by such European toothbrush mould manufacturers as Anton Zahoransky GmbH (DE) and Machines Boucherie NV (BE). Such moulds also necessarily incorporate ancillary operative and constructional features, for example a mould frame, e.g. comprising injection points for plastic and elastomer materials, to enable the mould to match a standard injection moulding machine as used by a toothbrush manufacturer.

The first mould cavity and the second mould cavity are preferably made in a multi-part, e.g. two-part mould construction, each part defining a respective part of the mould cavity thereby allowing the mould cavity to be opened to allow the body to be separated from the mould. Moulds of this general type, of multi-part construction, for use in injection moulding processes for the manufacture of toothbrushes and similar moulded articles, and in which the article is formed by injection moulding into a mould cavity within the mould are well known in the art. Typically each part of such a two-part mould may comprise a block of the metal having cut into it a part mould cavity, and when the two blocks are put together the two part cavities define the entire mould cavity.

Toothbrush moulds generally are of such two part construction, each part defining a part mould cavity which corresponds to the entire mould cavity split generally along the toothbrush axis. In such a mould the first and second mould cavities may have an open end at the end remote from the toothbrush head, and through which the mould cores may extend. In such a construction the mould cores may taper along the length of the toothbrush grip handle, being wider at the end remotest from the toothbrush head. This enables the mould core to be easily withdrawn from the body cavity.

The one or more members are preferably located on the inner wall surface of the first mould cavity, and are preferably made integrally with the mould, enabling the members to be easily removed from the formed apertures, for example as the mould is opened. Alternative constructions are possible, for example members may project from or be made integrally with the first core. The apertures, and correspondingly the members, may taper, narrowing in dimension from their outer end toward their inner end, again facilitating separation. When the apertures are filled with the second material their open outer ends form areas of the second material exposed and visible on the outer surface of the body of the article.

Between the inner wall of the second mould cavity and the body there may be convexities, e.g hollows in communication with the said apertures and channels, allowing the second material to flow into these convexities and form areas of second material exposed at the surface of the formed article. These areas of exposed second material can enhance the appearance of the article and, particularly if they are convex bulges, can enhance grip. In the type of childrens' toothbrush mentioned above, the areas may for example form features of the character. Alternatively the areas of exposed second material, or contrasting first material within such areas, may spell out and display textual matter such as a trade mark used in relation to the product. Such display techniques are well known in the toothbrush art.

Suitably the respective plastic material and elastomer are known materials used in two-component toothbrush manufacture and may be of contrasting or complementary colours to emphasise the construction of the article such as a toothbrush by producing a visual effect. For example if the grip handle is in the form of an animal character exposed areas of the elastomer may represent features of the character e.g. coloured patches or stripes. Injection moulding conditions for such materials are well known.

In an optional further step of the process of the invention when the second core has been removed from the body cavity the body cavity may be closed by a closure, such as a plug or cap that may be fitted into the open end of the body cavity by conventional means such as a snap-fit or friction fit etc. This closure may be shaped to further enhance the visual appearance of the article, e.g. in the case of a character-shaped children's toothbrush being in the form of feet for the character. Alternatively the closure may be visually relatively insignificant. In the case of articles which are bulky handled toothbrushes the closure or the body itself may have a flat end perpendicular to the axis of the toothbrush, or a sucker etc. enabling the toothbrush to be stood upright thereupon.

The process of the invention may be automated, for example to enable mass-production of products such as toothbrushes. Suitable injection moulding machines capable of using moulds of the kind described above and the process of the invention are commercially available, e.g. from the abovementioned Anton Zahoransky GmbH and Machines Boucherie NV.

When a toothbrush body is made by the above described moulding process, the moulding process may be followed by a subsequent process of providing the toothbrush with bristles. These may be provided by known bristle introduction processes. For example the toothbrush head may be moulded with socket holes into which the bristles may subsequently be inserted in a well known process. Alternatively the bristles may be moulded into the head material, e.g. by an application of known processes such as that disclosed in EP 0293665 or WO 95/30350. Alternatively the toothbrush head and handle may be formed separately, e.g. by the process described in PCT/EP 96/02978 the content of which is included herein by way of reference.

The invention also provides a first mould cavity adapted for use in the process of this invention.

The invention also provides a first mould adapted for use in the process of this invention, for example incorporating a first mould cavity as described above.

The invention also provides a first internal core for use in the process of this invention.

The invention also provides a second mould cavity adapted for use in the process of this invention.

The invention also provides a second mould adapted for use in the process of this invention, for example incorporating a second mould cavity as described above.

The invention also provides a second internal core adapted for use in the process of this invention.

The invention also provides a process in which such above-mentioned moulds and cavities are made, for example a spark-erosion or electrical discharge machining process.

The invention also provides a moulded article, particularly a toothbrush body, made by the process of this invention.

Such a toothbrush for example comprises a bristle-bearing head and a hollow moulded grip handle body having a body wall made of plastics material, having apertures passing through its plastics material body wall from an internal body cavity to the outer surface, the apertures being filled with a moulded second material, the second material in the cavities being linked by residual second material in moulding channels in, or residual second material on the inner surface of the body cavity. The internal body cavity of the toothbrush may be closed by a closure at its end remote from its head.

The so formed toothbrush may incorporate known features such as a handle which includes a folded region as disclosed in EP 0336641A or by using the process of this invention or otherwise, cut-outs, e.g. as described in U.S. Pat No. 5,054,154, filled with elastomeric material may be incorporated into the handle, neck or head to modify flexibility.

The invention will now be described by way of example only with reference to the accompanying drawings which shows:

FIGS. 1 to 4 schematically show sequential stages in the use of the process of the invention to make a toothbrush.

Figure 6:
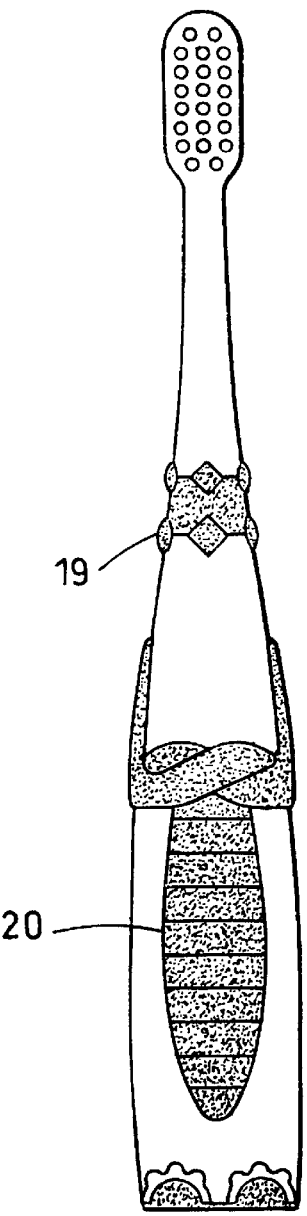
Figure 5:
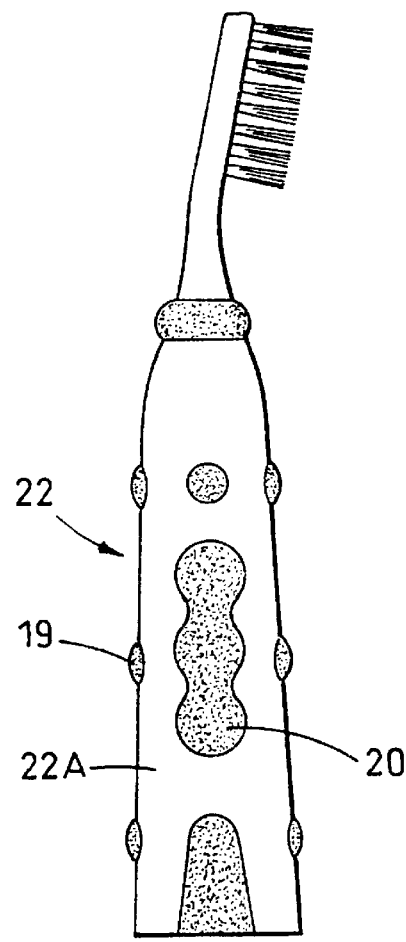

FIGS. 5 and 6 show toothbrushes which may be made by the process of the invention.

Referring to FIG. 1, a first mould 1 overall is shown, made in two mating halves 1A, 1B. Each half 1A, 1B is made of accurately machined hardened steel. The mould includes a first mould cavity 2 which defines the shape of a toothbrush body, each of the two halves 1A, 1B defines a part cavity so that when the two halves 1A, 1B are put together the entire cavity 2 is defined. Within the mould cavity 2 is a first internal core 3 distanced from the inner wall of the mould cavity 2, and located within the part of the mould cavity 2 which will ultimately define the toothbrush grip handle. The mould cavity 2 has an open end furthest from the toothbrush head to be formed, and through this open end the core 3 is inserted. The core 3 is also made of hardened steel.

Extending from the inner wall of the mould cavity 2 are internal members 4 integrally formed with the metal of the mould 1 and extending between the inner wall and the surface of the core 3, the inner ends of the members 4 mating with the surface of the core. The members 4 taper, being widest at their end nearest the mould 1 and narrowest and their end nearest the core 3. The core 3 forms a flange seal 5 with the mould cavity 2, although the cavity could be sealed in other ways.

A fluid molten plastic material (not shown in FIG. 1) is injected into the cavity 2 via an injection port 6 positioned at a convenient point in the mould 1 or in the flange seal 5 in an entirely conventional injection method. Although positioned at point 6 the injection port may be at other places in the mould as will be apparent to those skilled in the art, and the mould 1 may also be provided with air exit port(s) (not shown) to allow air to exit during the injection.

Figure 2:
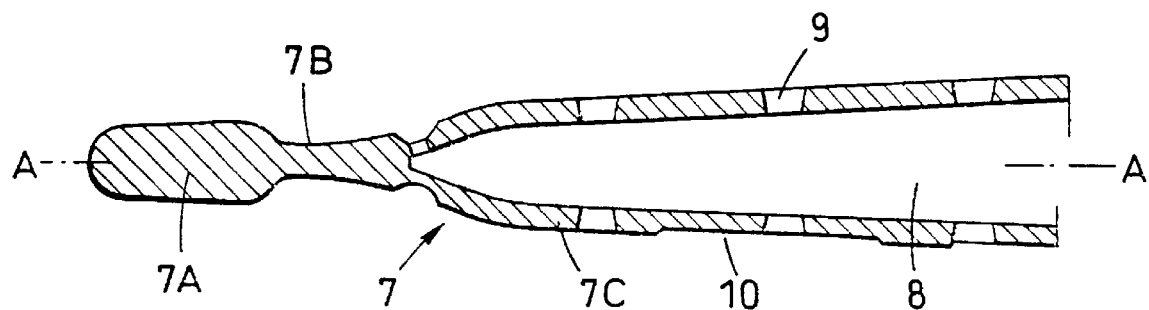

The above-described molding step produces a toothbrush body 7 (generally) shown in FIG. 2. This body comprises a head 7A into which bristle tufts (not shown) may be inserted by a conventional process, a neck 7B, and a grip handle 7C, all arranged along a toothbrush axis A—A. By the above-described process the grip handle 7C has an internal body cavity 8 corresponding to the shape of the core 3, and apertures 9 pass through the grip handle 7C corresponding to the shape and position of the members 4. Some apertures 9 communicate with the surface hollows 10 in the outer surface of the grip handle 7C of the body 7. The body 7 has been separated from the mold 1 by disassembly of the mold 1.

Figure 3:
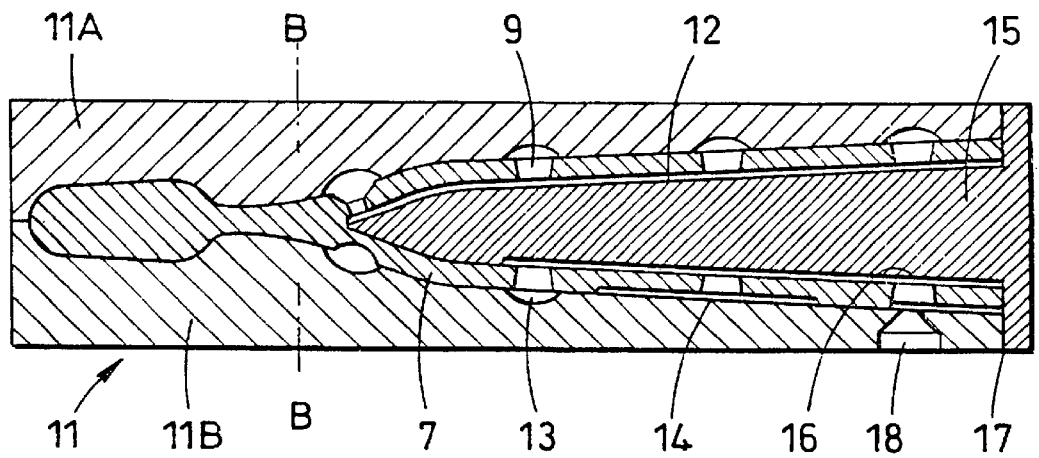

Referring to FIG. 3 the moulded body 7 has been enclosed in a second mould 11, made in two mating halves 11A, 11B, and having a second mould cavity 12, similar in its overall construction to the first mould 1. The internal shape of the second mould cavity 12 corresponds closely to the external shape of the body 7, but in places adjacent to the apertures 9 the mould cavity has hollows 13 and in places adjacent to surface hollows 10 the mould cavity 12 does not follow the line of the hollow 10, so as to leave a cavity 14. A second internal core 15 has been inserted into the body cavity 8, the core 15 corresponding generally to the shape of the body cavity 8. Between the core 15 and the inner wall surface of the body cavity 8 are channels 16, in communication with the apertures 9. The core 15 is formed into a flange seal 17 to close the open end of the mould cavity 12. It will be appreciated that the second mould cavity 12 does not need to enclose the entire toothbrush body 7 but only needs to enclose the grip handle 7C, and the head 7A and neck 7C may project from the mould cavity, e.g. if the mould 11 ends at the dotted line B—B.

A fluid mouldable suitable material being an elastomer is injected into the mould cavity 12 via an injection port 18. Although positioned at point 18 the injection port may be at other places in the mould 11 as will be apparent to those skilled in the art, and the mould 11 may also be provided with air exit port(s) (not shown) to allow air to exit during the injection. The injection port 18 is located such that the material can flow along the channels 16, through the apertures 9 and into the hollows 13 and the cavities 14. When this moulding operation is complete the mould 11 can be dissembled and the core 15 removed from the internal cavity 8.

Figure 4:
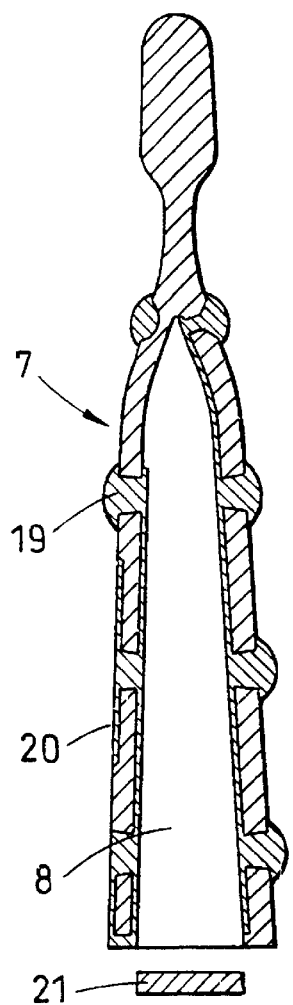

The flow of the material as described above produces the body as shown in section in FIG. 4. The material is solidified in the apertures 9, hollows 13, cavities 14 and channels 16, to leave internal residual material along the inner surface of the body cavity 8 and in the apertures 9. The material solidifying in the hollows 13 has formed external bulges 19, and the material solidifying in the cavities 14 has formed larger flat areas 20 of the material. The open end of the body cavity 8 may be closed by a closure 21 which is a tight snap-fit in the open end.

FIGS. 5 and 6 shows a view of a children's toothbrush 22 as made by the process of this invention. The toothbrush 22 has a bulky handle 22A, but as this is hollow, having the body cavity 8 (not shown in FIGS. 5 and 6) it is relatively light. The bulges 19 and larger areas of elastomer 20 form a pattern. The pattern shown in FIG. 5 is purely representative, and the bulges 19 and areas 20 could equally well lie in a pattern and/or be of shapes representing features of an animal character, e.g. pictorial features on a kangaroo character as shown in FIG. 6.

The closure 21 fits flush into the end of the body cavity, but could just as well be shaped into a character's feet, upon which the upright toothbrush 22 can be stood. By provision of further channels 16 and of further apertures 9, hollows 13 and cavities 14 it is easy to form bulges or larger areas on the toothbrush handle 22A and neck 22C if desired, e.g., to provide the head with flexibility by, for example, the presence of elastomer filled grooves and spaces as disclosed in EP 0613636 A, WO 92/17092 or WO 92/17093. The elastomer is that of a contrasting colour to that of the plastic material of which the body 7 is made.

It is seen that separate areas of elastomeric material are visible on the outer surface of the handle 22A without moulding channels visible between them in the outer surface of the handle 22A. Also the multiple areas of elastomer are injected with a single injection port. Also the toothbrush handle 22A is bulky, yet is hollow, thereby being light in weight and using less plastic resources.

What is claimed is:

1. A process for making a molded toothbrush body comprising a grip handle and a head all arranged along a longitudinal toothbrush axis, with a body cavity within the grip handle, which comprises the steps of:

in a first mold cavity, having a first internal core within the cavity and distanced from the inner wall surface of the cavity, and having one or more internal members which extends between the inner wall and the core, forming the toothbrush body by injection molding of a plastics material having an internal body cavity within the grip handle corresponding substantially to the shape of the first core and having apertures passing through the body from the body cavity to the outer surface of the body corresponding substantially to the shape and position of the one or more internal member;

separating the formed body from the first mold cavity and removing the first core from the body cavity;

enclosing the formed body in a second mold cavity having an inner wall surface, and inserting a second internal core into the body cavity, between the second core and the inner surface of the body cavity there being at least one channel in communication with the apertures when the second core is in place in the body cavity;

injecting a fluid moldable, settable material into the channels such that the material flows along the channels and into the apertures and then sets;

separating the so-formed toothbrush body from the second mold cavity and the second core from the body cavity.

2. A process according to claim 1 wherein the first mold cavity and the second mold cavity are each respectively made in a multi-part mold construction, each part thereof defining a part of the respective first or second mold cavity thereby allowing the mold cavity to be opened to allow the body to be seperated from the mold.

3. A process according to claims 1 wherein the one or more internal members are located on the inner wall surface of the first mould cavity.

4. A process according to claim 1 wherein the members taper, narrowing in dimension from their outer end toward their inner end.

5. A process according to claim 1 wherein between the inner wall of the second mould cavity and the body there are hollows in communication with the said apertures and channels, allowing the second material to flow into these hollows and form areas of second material exposed at the surface of the formed toothbrush body.

6. A process according to claim 1 wherein when the second core has been removed from the body cavity the body cavity is closed by a closure.

* * * * *